Oct. 22, 1935.   F. W. COTTERMAN   2,018,488
AUTOMATIC TRANSMISSION GEARING
Filed July 13, 1934    4 Sheets-Sheet 1

Fig. 1.

INVENTOR
Frederick W. Cotterman

Oct. 22, 1935.                F. W. COTTERMAN                    2,018,488
                        AUTOMATIC TRANSMISSION GEARING
                            Filed July 13, 1934         4 Sheets-Sheet 3

INVENTOR
Frederick W. Cotterman

Oct. 22, 1935.  F. W. COTTERMAN  2,018,488
AUTOMATIC TRANSMISSION GEARING
Filed July 13, 1934  4 Sheets-Sheet 4

INVENTOR
Frederick W Cotterman

Patented Oct. 22, 1935

2,018,488

UNITED STATES PATENT OFFICE 2,018,488

AUTOMATIC TRANSMISSION GEARING

Frederick W. Cotterman, Dayton, Ohio, assignor of one-half to Bessie D. Apple, Dayton, Ohio Application July 13, 1934, Serial No. 735,015

20 Claims. (Cl. 74—336)

This invention relates to transmission gearing of the class used in motor vehicles for changing the ratio of revolutions between the engine and axle, and embodies some of the features employed in my co-pending application Serial Number 694,627, filed October 21st, 1933, now Patent No. 1,981,823 dated Nov. 20, 1934, with modifications and additions which will hereinafter more fully appear.

An object of the invention is to provide and connect two gear sets in series, the one operable automatically to change from gear to direct drive or vice versa, the other operable manually to change from neutral to gear drive, direct drive or reverse, the gear ratio being such that the automatically operable gear set will take care of all variations needed in ordinary forward driving while the manually operable gear set is brought into use only when it is desired either to warm up the engine in neutral position, ascend or descend mountainous grades in the manually shiftable low gear, or back up the vehicle in reverse gear.

Another object is to provide an automatically operable gear set which is speed-torque responsive to the extent that it will balance the torque load of vehicle movement against the power which the engine can develop with the fuel then being fed to it, and shift up if the engine power overbalances the load and down if the load over balances the power regardless of what the vehicle speed may be when such conditions may occur.

Another object of the invention is to provide an automatic gear set comprising a clutch for direct drive which is engageable by axial pressure supplied by centrifugal weights, and gears for gear drive which have helical teeth such that the tangential load being carried by the gear teeth creates an axial thrust opposite in direction to the clutch engaging pressure of the weights, together with means to balance said axial component against said weight force to pull said weights toward, or allow them to move away from the axis of rotation as said axial thrust exceeds or is less than said weight force.

Another object is to so balance the load force of vehicle movement, which tends always to disengage the clutch and cause gear drive, against the power force, which tends always to engage the clutch for direct drive, that when either force overbalances the other at all it does so considerably, to the end that the clutch will not, over extended periods of time, be partially but insufficiently engaged and subject to consequent wear.

Another object is to provide ratio changing mechanism which will normally function automatically, but which will nevertheless be subject to the will of the operator to the extent that he may, by governing the amount of power generated, and the rapidity with which it is increased or decreased, control the change in ratio to meet his particular desire.

Another object is to employ, in the mechanism which automatically changes from gear drive to direct drive and vice versa, a plate clutch of such general type as is known to be highly successful when operating in an oil bath within the transmission housing and which has a large contact area operating at low contact pressure, to the end that all of the oil will never be entirely pressed from between the clutch plates, whereby little or no wear results, and adjustment is therefore seldom if ever required, but which nevertheless may, if it should become necessary be readily adjusted by a single nut, placed outside of the housing whereby adjustment may be accomplished with minimum effort.

Another object is to provide, in a transmission gear set which automatically changes from gear drive to direct drive and vice versa, mechanism which will make the change from one drive to the, other without a time interval between them, the one drive always becoming effective before the other lets go, to the end that there will be no time between direct drive and gear drive in which there is no drive, as there is in present transmission mechanisms.

Another object is to provide unique lubricating means for the transmission mechanism.

Another and more general object is to provide means to attain the foregoing objects with substantially no more mechanism, and requiring substantially no greater space, and being of no greater cost than transmission mechanisms now in general use.

I attain the foregoing objects and other meritorious features in the mechanism hereinafter described, reference being had to the drawings, wherein.

Similar numerals refer to similar parts throughout the several views.

Figure 1:
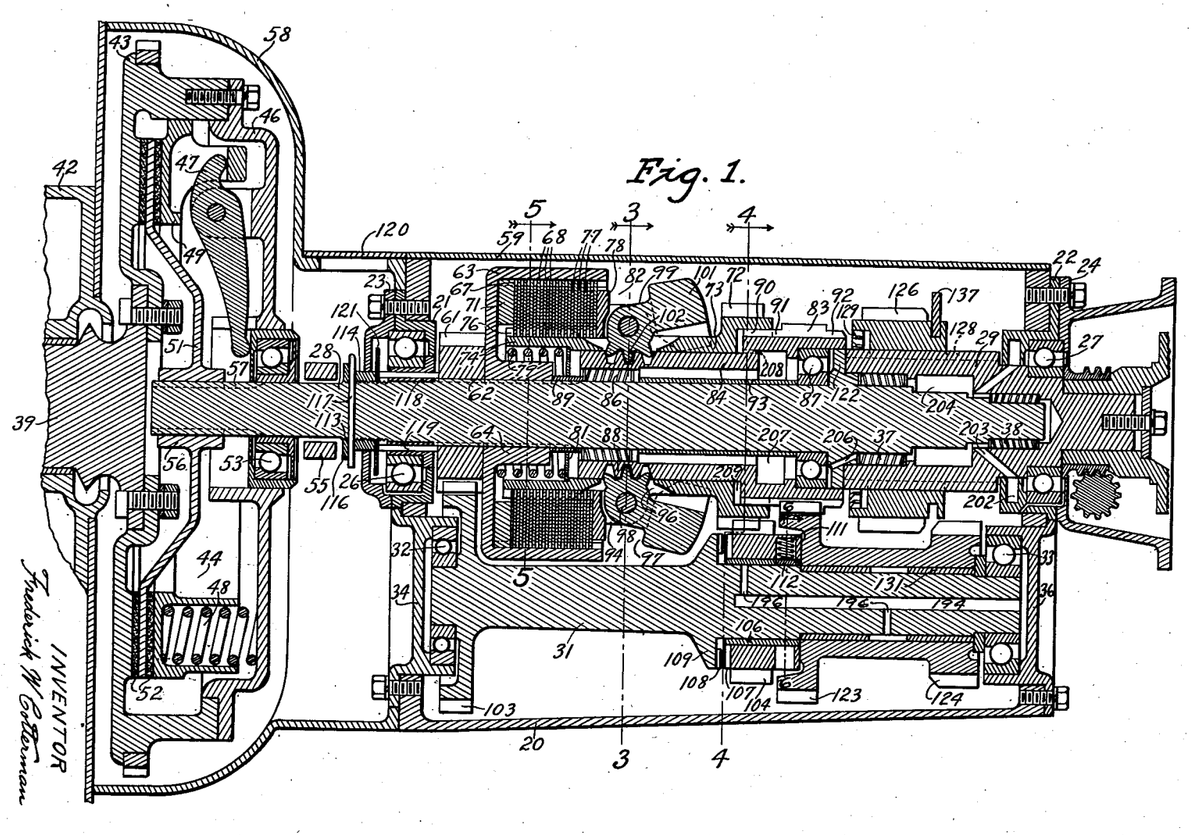
Fig. 1 is a longitudinal-vertical-axial section taken through the clutch and transmission mechanism.

Referring to Fig. 1, a housing 20 carries the ball bearing cages 21 and 22 within which the bearing covers 23 and 24 hold the ball bearings 26 and 27, which in turn provide rotative support for the high speed drive shaft 28 and the coaxial hollow low speed driven shaft 29. A parallel spaced apart countershaft 31 is rotatable on ball bearings 32 and 33 held in cages 34 and 36 respectively secured in the ends of the housing 20. The rear end of the drive shaft 28 is rotatable within the driven shaft 29 on roller bearings 37 and 38.

The engine 42 has a flywheel 43 which contains the engine clutch which may be broadly designated by the numeral 44. A clutch cover 46 carries the dogs 47 and the springs 48 which move the pressure plate 49 rearward and forward respectively.

The clutch plate 51 has secured thereto suitable friction facings 52 which are normally gripped between the flywheel 43 and the pressure plate 49 but are freed when the dogs 47 draw the pressure plate rearward, which occurs when the thrust bearing 53 is moved forward against the inner ends of the dogs. A clutch operating fork 54, Fig. 2, has ends 55, Fig. 1, which bear upon the thrust bearing 53 to move it forward. The hub 56 of the clutch plate 51 is slidably splined at 57 to the shaft 28.

The function of the engine clutch 44 is, of course, to connect the crankshaft 39 to the drive shaft 28, whereby the two said shafts will be revolved in unison, or to disconnect it therefrom whereby they may revolve at different speeds.

Secured to the engine 42 is the flywheel cover 58 which in turn supports the transmission housing 20 and its cover 59. Rotatable within the housing 20 about the axis of the shafts 28, 29 and 31 are the transmission gears, the front half of the housing containing an automatically operable gear-set and the rear half a manually operable gear-set.

Each gear set comprises a drive gear, a driven gear, and two spaced apart countershaft gears. For convenience of description the two sets will be distinguished by referring to them as the automatic gears and the manual gears.

It will be observed that the last driven member of the automatic unit is the element from which power is taken to drive the manual gears.

If the automatic unit were used alone, without the manual gears, as is entirely feasible, this last driven member of the automatic set would be the element from which power would be taken to drive the vehicle. For clearness, therefore, the element herein, which is the driving gear of the manual set, will, when used in a combination of elements defining the automatic mechanism, be referred to as the power take-off element.

In the automatic gear set is the drive gear 61 which has internal splines fitted snugly to the external splines 62 of the drive shaft 28. The clutch drum 63 has a rearwardly extending hub 64 containing internal splines fitted snugly to the external splines 62 of the drive shaft 28. The drive gear 61 and the clutch drum 63 therefore always rotate in unison with the drive shaft 28.

The clutch drum 63 has internal clutch teeth 67 around its periphery. A series of driving clutch-plates 68 are externally toothed to fit slidably in the teeth 67 and consequently rotate in unison with the drum 63. A thicker driving clutch plate 71 is adjacent the web of the clutch drum, and is preferably fitted tightly to the clutch drum.

The driven gear 72 has a long forwardly extending hub 73 which, at the extreme forward end 74, is provided with external clutch teeth 76. A series of driven clutch plates 77 are internally toothed to fit slidably over the teeth 76. One driven clutch plate 78 is thicker than the plates 77 and is preferably press fitted to the teeth 76.

In the space between the outside of the clutch drum hub 64 and the end 74 of the driven gear hub is a coil expansion spring 79 which bears against the washer 81 and thereby constantly urges the driven gear 72 rearwardly.

Driving clutch plates 68 and driven clutch plates 77 alternate in position in the assembled structure. It will be apparent that pressure applied to the thicker driven clutch plate 78 to urge it forward will have the effect of compacting the clutch plates 68 and 77 whereby the clutch will be engaged. The clutch just described will be called the transmission clutch and will be broadly designated by the numeral 82.

Gear 83 is the driving gear of the manual gear set. It is also the last member of the automatic gear set to be driven and may therefore be called the power take-off element of the automatic gear set.

Gear 83 has a long forwardly extending hub 84 ground smooth and round on its outside diameter. The forward end of the hub 84 has rotative support on the drive shaft 28 by the roller bearing 86. The rear end of the gear 83 has rotative support on the drive shaft 28 by the combined radial and end thrust ball bearing 87. Thin walled tubes 89 and 93 keep roller bearing 86 in place axially. These tubes should be short enough to allow movement of the clutch drum hub 64 rearwardly when the clutch 82 is adjusted.

At four places on the outside of the hub 84 it is grooved transversely to provide the rack teeth 88. The outside of gear 83 has straight spur gear teeth. These teeth are reduced in height at both ends to provide two sets of clutch teeth 91 and 92.

The clutch teeth 91 are slidably fitted to corresponding internal clutch teeth 90 carried on the inside of the rim of the driven gear 72. The long hub 84 of the gear 83 fits slidably into the long hub 73 of the driven gear 72.

Figures 3, 5, 6:
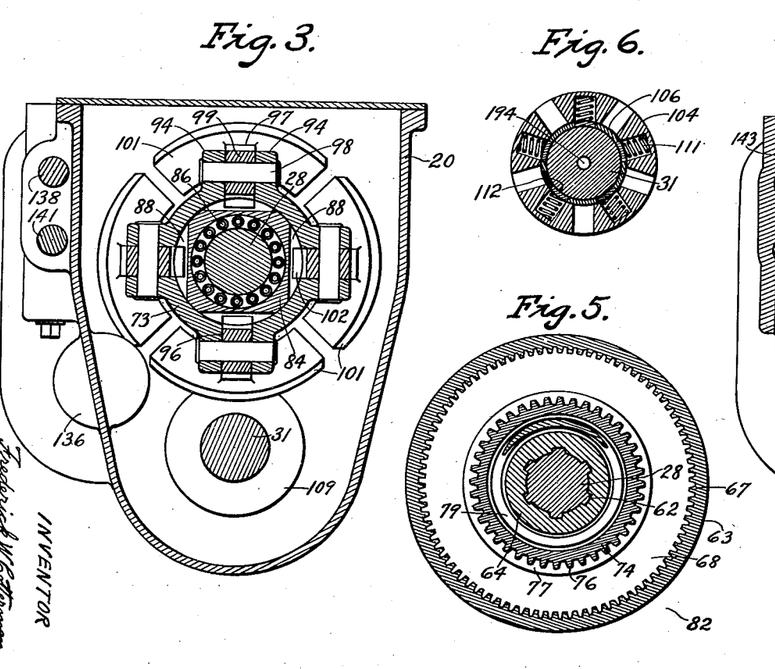
Fig. 3 is a transverse section taken on the line 3—3 of Fig. 1 showing the automatic clutch operating mechanism.
Fig. 5 is a partial transverse section taken at 5—5 of Fig. 1.
Fig. 6 is a partial transverse section taken at 6—6 of Fig. 1.
Figure 4:
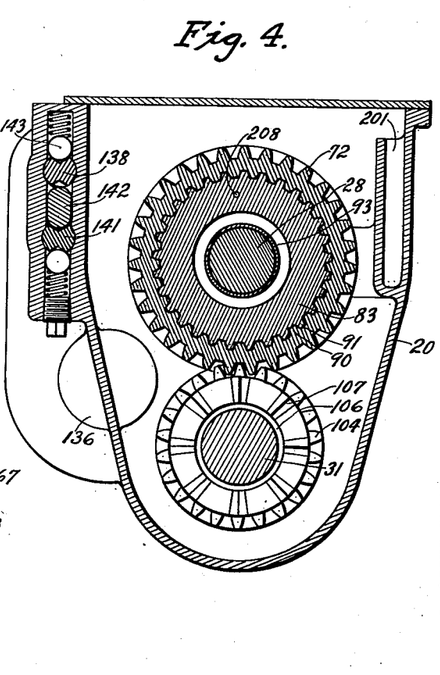
Fig. 4 is a transverse section taken on the line 4—4 of Fig. 1 showing some of the gearing which has slight axial movement automatically.

At the middle of the long hub 73 of the driven gear 72 four pairs of spaced apart hinge ears 94 extend outwardly from the hub and are integral therewith. Between the two ears of each pair the hub 73 is cut through as at 96. Between these ears and extending through these cuts the four centrifugal members 97 are hingedly supported by the hinge pins 98.

Each centrifugal member 97 comprises the hinge end 99 and an arcuate weight portion 101 extending transversely of the hinge end. At the inner sides of the hinge ends 99 are pinion teeth 102 which mesh with the rack teeth 88 of the hub 84. The hinge pins 98 provide fulcra about which the centrifugal members 97 may swing. It will be seen that the outward swinging of the weight portions 101 will force the entire driven gear 72 with its long hub 73 and the heavy clutch plate 78 forward and thereby compact the discs to engage the transmission clutch 82. The ball bearing 87 takes the axial thrusts caused by the gear 83 being forced rearwardly as the clutch engages.

The forward end of the countershaft 31 has the gear 103 integral therewith meshing with drive gear 61. Farther rearward on countershaft 31 the gear 104 provided with the bronze bushing 106 is freely rotatable.

Jaw clutch teeth 107 are carried on the forward face of gear 104 and corresponding clutch teeth 108 are carried on the rearward face of an integral flange 109 of the countershaft. It follows that when the gear 104 is shifted forwardly on the countershaft it is driven thereby through the jaw clutch teeth 107 and 108, while when it is shifted rearwardly as shown it rotates freely on the countershaft. A series of springs 111 bearing on bronze pads 112 produce a light friction on the countershaft 31 to prevent the gear 104 from spinning too freely thereon.

Gears 61, 103, 104 and 72 have helical teeth the helix angles of which are such that when they are transmitting a torque load the gears 103 and 104 are urged axially toward each other and the gears 61 and 72 are urged axially apart. It will be seen that movement of gears 103 and 104 axially toward each other will result in engagement of the jaw clutch teeth 107 and 108 whereby the gear 103 will drive the gear 104, and movement of gears 61 and 72 axially apart will result in keeping the clutch 82 disengaged.

But while the transmission of torque load tends to force the gears 61 and 72 axially apart, the centrifugal force of the weight masses 101 acting through the pinion segment teeth 102 and rack teeth 88 urges the gear 72 axially forward toward the gear 61 to thereby engage the clutch 82. The result is that the greater the torque load being transmitted by the gears the higher the speed which must be attained before the clutch 82 will be engaged to change from gear drive to direct drive.

The clutch disengaging spring 79 is preferably of such strength that it will be overcome by the weights 101 at a vehicle speed of about 6 M. P. H., whereby the gear 72 will move forward. But this is true only when there is zero load on the gear 72 and therefore nothing urging it rearward except the spring 79.

It follows that the gear 72 will always be in its rearward position at a vehicle speed of less than 6 M. P. H., and it will be in this same rearward position at higher vehicle speeds when a load is being carried by the gear 72. But the gear 72 will always go to the forward position when the vehicle speed of 6 M. P. H., or over is reached unless restrained by a torque load.

At the forward end of the housing 20 the shaft 28 has the threads 113 to which the nut 114 is fitted. The nut 114 is slotted at 116, and the pin 117 extends through this slot and through the shaft 28. A flanged hub 118 is fitted tightly to the shaft 28, and the ball bearing 26 is press fitted to this flanged hub. A series of small pins 119 are slidable axially through holes in the hub 118, one end of the pins bearing against the gear 61 and the other end against an oil throw washer 121. Tightening of the nut 114 against the washer 121 will push the pins 119 against the gear 61 whereby the gear 61 and the drum 63 may be forced rearwardly when adjustment of the clutch 82 becomes necessary due to wear on the plates 68 and 77. A small removable cover 120 gives ready access to the nut 114.

When the clutch 82 is engaged, the gear 61 is pressed forward against the pins 119, while the ball bearing 87, although not then operating, is pressed rearwardly against the flange 122 of the shaft 28, the entire mass then rotating in unison, there being no bearing rotating under any axial thrust.

Figure 7:
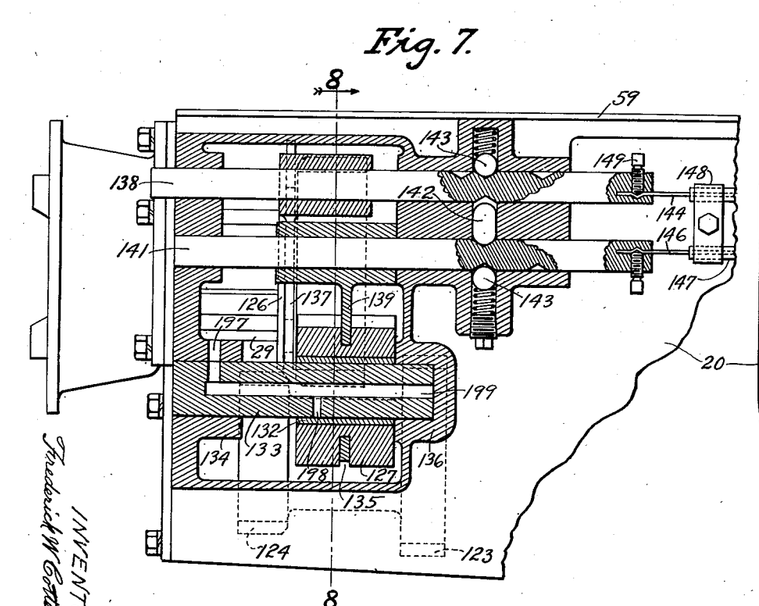
Fig. 7 is a partial rear view of the transmission with the housing broken away to show the reversing gearing.
Figure 8:
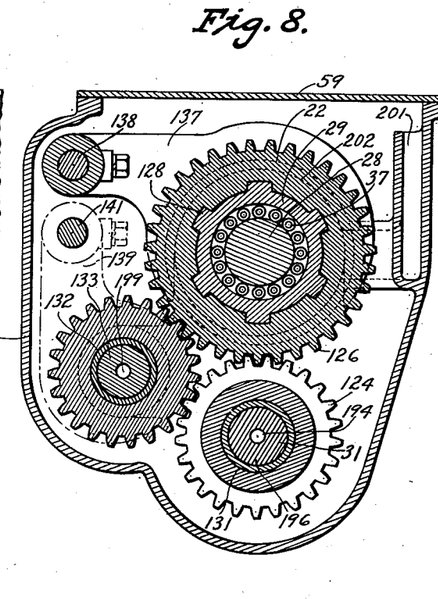
Fig. 8 is a transverse section through the reversing gearing taken at 8—8 of Fig. 7.

The manual gear set comprises the manual driving gear 83, the first and second manual countershaft gears 123 and 124, and the sliding high and low gear 126. An elongated idler gear 127 (see Figs. 7 and 8), constantly in mesh with the sliding gear 126 is shiftable rearwardly until it meshes with both the gear 126 and the gear 124 while the gear 126 remains in the neutral position. This position of the idler gear causes the sliding gear 126 to rotate the driven shaft 29 backwardly of the rotation of the driving shaft 28 for reversing the vehicle.

Sliding gear 126 is shown in the neutral position (see Fig. 1). It must have width of face sufficient to insure that it will not pass wholly out of mesh with the elongated idler gear 127 when the gear 126 is moved rearwardly into mesh with the gear 124, for low gear, while the elongated idler gear 127 remains in neutral position, for, if the gear 126 could be shifted rearwardly out of mesh with the reverse idler gear 127, and the vehicle then came to a stop, it might become difficult to shift the gear 126 forward to neutral position if its teeth happened to be out of alignment with the teeth of the reverse idler gear 127. The gear 126 has internal splines which fit slidably over the external splines 128 of the driven shaft 29.

The forward face of the gear is recessed and around the periphery of the recess are the internal clutch teeth 129 which may be slidably engaged over the external clutch teeth 92. The gears 123 and 124 are integral and revolve with the countershaft 31, but inasmuch as they rotate slightly slower than the countershaft they are provided with bronze bushings 131. The elongated reverse idler gear 127 is rotatable on a bearing bushing 132 about the short stationary shaft 133 which is held against rotation in the hubs 134 and 136 of the housing 20 (see Figs. 7 and 8).

A shifting fork 137 secured on and movable axially by the shifting rod 138 is provided for moving the sliding gear 126. A second shifting fork 139 secured on and movable axially by the shifting rod 141 extends into a groove 135 of the sliding reverse idler gear 127 whereby said gear may be shifted axially rearwardly. A shifting rod lock 142 prevents either shifting rod moving from the neutral position shown when the other has already been moved. Detent balls 143 resiliently hold the rods in the several positions to which they may be moved. Control wires 144 and 146 extend through casings 147 held in place by the clamp 148. The wires are held in the shifting rods by the set screws 149.

Suitable control knobs for operating the wires 144 and 146 may be carried on the instrument panel or on the steering column of the vehicle.

The lubricating mechanism of the countershaft is of simple form comprising merely a central hole 194 in the end of which the oil flows by gravity and two radial holes 196 for feeding oil to the bearing bushings 106 and 131. The reverse idler gear bushing 132 is kept lubricated through the radial holes 197 and 198 and the axial hole 199. The drive shaft lubricating means comprises a trough 201 (see Fig. 8) cast integral with the housing 20 which catches oil splashed into it by the gears and conveys it to and into the groove 202 of the bearing cage 22 (see Fig. 1).

Each time the hollow driven shaft 29 ceases rotation, the oil flows through the holes 203 into the chamber 204, through the roller bearing 37, holes 206, ball bearing 87, into the chamber 207, through the roller bearing 86 and into the interior of the clutch 82. Some of the oil in the chamber 207 flows outwardly through the small hole 208 into the annular space 209 between the gears 72 and 83.

Each time the clutch 82 is disengaged, the space 209 is completely closed thereby forcing all of the oil back through the small hole 208 into the chamber 207. Also each time the clutch is engaged the annular space 209 is remade and oil must be drawn from the chamber 207 to fill the space. There is therefore a dash pot action tending to prevent the clutch 82 from engaging or disengaging too rapidly. The size of the hole 208 controls the rapidity of clutch engagement or disengagement.

It will be observed that the inner ends of the holes 203 are closer to the axis of rotation than the outside diameter of the chambers 204 and 207. The oil which once reaches these chambers while the shaft 29 is not rotating will be prevented by centrifugal force from going back out of the holes 203 after the shaft again rotates. Lubricating mechanism of this character is shown in my copending application Serial Number 675,238, filed June 10, 1933.

When the mechanism is first put into use it is preferably adjusted by screwing up the nut 114 tightly so that the plates 68 and 77 are all pressed together tightly and the segmental weights 101 are all forced inwardly until they lie against the hub 73. The nut 114 is then backed away one complete turn and the pin 117 inserted. This will leave about .005 inch spaces between adjacent plates. These .005 inch spaces will be taken up by movement of the weights 101 through half of their possible travel.

When the plates become worn so that there are .006 inch spaces between them then the weights merely travel through six tenths of their possible travel to take up the spaces. It is not until the plates become worn to an extent which will leave .010 inch spaces between adjacent plates that adjustment must be repeated, for, when there are .010 inch spaces between adjacent plates it will have become necessary for the weights to move outwardly so far that the segment teeth 102

R. P. M., and drops to about 105 foot pounds at 3000 R. P. M., when this engine is geared to a present day vehicle weighing about 3000 pounds in such a manner that, at 3000 engine R. P. M., the vehicle will be moved 72 M. P. H., when its power is transmitted through the transmission mechanism directly, that is, without employing any gear reduction.

An automotive vehicle employing the transmission mechanism described is preferably operated as follows:

The operator sets the gear 26 in neutral position as shown in the drawings Fig. 1, starts the engine, warms it if advisable, then disengages his flywheel clutch 44, moves the gear 126 forward until clutch teeth 129 and 92 engage, then engages the flywheel clutch 44. The engine torque will now be transmitted through manual high gear and also through automatic low gear.

The engine torque is conveyed through the drive shaft 28, through the gears 61 and 103 to the countershaft 31.

The countershaft 31 attempts to drive the gear 104 by the friction pads 112, but due to the helix angle of the teeth of gears 104 and 72, the slightest rotative movement of the gear 104 will shift it axially forward toward the countershaft flange 109 thereby engaging the clutch teeth 107 and 108 whereupon the gear 104 and countershaft 31 are drivably secured together.

Gear 72 will now be rotated at half the speed of the gear 61, and the rotative movement of gear 72 will be transmitted to the rear axle without further gear reduction. If maximum engine torque is now being transmitted, the gears 103 and 104, due to their tooth angles, will be pressed toward each other with a pressure of about 650 pounds, while for the same reason the gears 61 and 72 are being forced axially apart with an equal 650 pound pressure. The axial thrusts are then balanced and there is no end thrust on bearings 32 and 33 of the countershaft, and none on bearings 26 and 27 of the main shaft, although the 650 pound rearward axial thrust of the gear 72 will be transmitted to the bearing 87, while the 650 pound forward axial thrust of the gear 61 is taken by the nut 114, the two being equal and opposite and therefore creating no tendency for the shaft 28 to move axially.

As soon as rotation of the gear 72 begins, the weights 101, carried by the gear 72, begin to exert an axial force tending to move the gear axially forward, that is, opposite to the direction in which it is being urged by the torque load. At posing force of the weights reaches 162 pounds and thereby engages the clutch 82.

It follows that the points at which the automatic gearing is eliminated and automatic direct drive is established in the process of accelerating the vehicle, depends on how badly the gearing is needed, that is, on how heavy a torque load is being applied by the engine to raise the vehicle speed, this point being 36 M. P. H., when all of the available engine torque is applied, 18 M. P. H., when one-quarter of the full engine force is applied, 12 M. P. H., when one-ninth of the full engine force is applied, etc.

But it does not follow that because at any given engine torque the automatic gearing is eliminated when the vehicle, responding to that amount of torque, reaches a given speed, that the use of the automatic gearing is not subject to the control of the operator, for instance if the operator, in accelerating, is maintaining one-half maximum engine torque, the automatic shift up will ordinarily take place at 25 M. P. H., but he may nevertheless, after acceleration has reached 10 or 12 M. P. H., shift up by momentarily slackening his accelerator to a point where he will be generating only about one-ninth maximum engine torque.

The process which takes place in shifting up from automatic gear drive to automatic direct drive is substantially as follows:

When the force of the weights 101 urging the gear 72 forwardly becomes slightly greater than the force of the torque load urging it rearwardly, the weights move outward, draw the gear 72 forward, and press the clutch plates 68 and 77 together. As soon as the clutch plates rub at all they exert some slight force to drive the gear 72 directly, whereby just that much less pressure exists between the teeth of gears 104 and 72.

There now ensues a closed cycle because as the clutch plates rub together harder and thereby carry a greater portion of the total load, that much more pressure is removed from the gear teeth, and the more pressure is removed from the gear teeth, the less the weights are opposed, and the less the weights are opposed the harder the clutch is engaged, and the harder the clutch is engaged the more the direct driving component relieves the gear tooth pressure, and so on for several seconds in which finally all of the torque load will be transmitted through the clutch 82 and none through the gearing.

It should here be noted that this transfer from gear drive to direct drive takes place without a time interval between the two drives within which there is no connection between the engine and the vehicle. First the gear drive alone is operative, then both gear and direct drive operate together for an instant, then the gear drive lets go and the direct drive alone is operative. This quality is not had in an automotive transmission of conventional design in the operation of which there is always an interval between gear drive and direct drive when there is no drive in effect, a condition which is recognized to be a source of danger, inasmuch as it sometimes becomes desirable, in an emergency, to instantly apply power, and when this occurs at a time when gear shifting is taking place an accident often results.

Of course any mechanism which will transfer from a friction clutch drive to a gear drive and vice versa, and which will overlap in so doing as does the herein described mechanism must permit some clutch slip in the transfer, whether up or down, but it should be noted that the slippage under load of the plates of clutch 82 is but of a few seconds duration no matter under what speed or torque condition the transfer occurs. This feature insures long life to the clutch.

The dash pot action resulting from the transfer of oil from the chamber 207 through the hole 208 into the space 209 prevents the shift up from taking place too rapidly.

Now it will be observed that, as soon as the shaft 28 drives the gear 72 directly, through the clutch 82, at any speed faster than it could be driven through the gearing, not only is all load removed from the gearing but the gear 72 begins to drive the gear 104 somewhat faster than the countershaft 31 is rotating.

Figure 2:
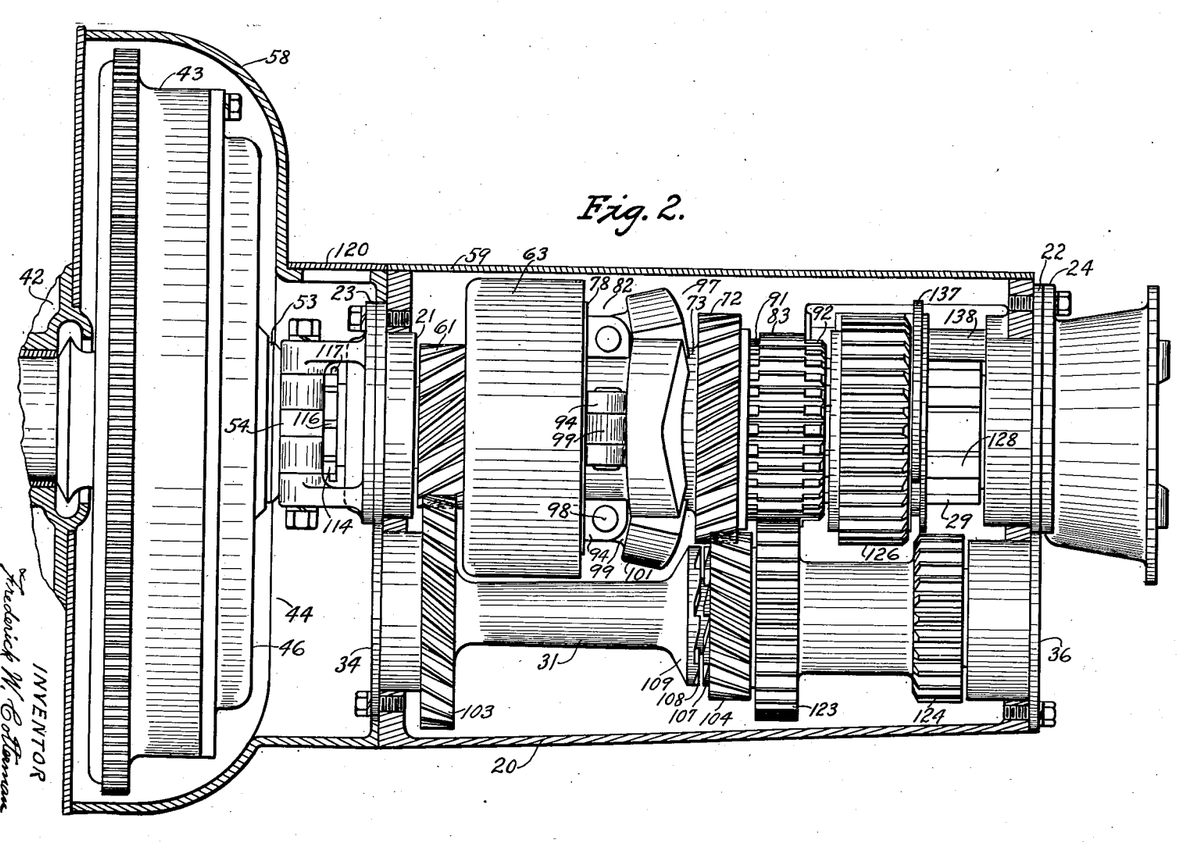
Fig. 2 is a side elevation of the transmission gearing but shown with the housing broken away.

Instantly this takes place the gear 104 is shifted axially rearward to the position shown in Fig. 1 or Fig. 2, whereupon the clutch teeth 107 and 108 are drawn apart. It will be seen that when gear drive is attempted the gear 104 shifts axially forward and fastens itself to the countershaft 31, and when direct drive becomes effective the gear 104 shifts axially rearward and lets go its hold on the countershaft 31, and that it always takes hold and lets go at the instant that the shaft and gear are exactly synchronized in rotative speed, thereby making and breaking its connection with the shaft without clash.

When the operator is driving in automatic direct drive and encounters a resistance to vehicle movement, such as a steep hill, which decelerates the vehicle in spite of the engine torque being developed and applied, the M. P. H., at which the shift down will take place will be governed by the relation between the resistance being encountered and the torque being generated and applied, for instance, if full engine torque is being developed and applied and the vehicle nevertheless decelerates, the shift down will take place when the vehicle drops back to 27 M. P. H., but if, for another instance, only one-ninth of the maximum engine torque is being generated and applied and the incline being climbed is so slight that the vehicle resistance only slightly overbalances this applied torque, then the shift down will take place at 9 M. P. H.

But while the shift down takes place automatically when the vehicle resistance overbalances the torque being generated and applied, the shift down is also within the control of the operator, for, if he is driving in direct drive at any vehicle speed of less than 27 M. P. H., and he suddenly creates and applies much higher engine torque faster than the vehicle speed can rise in response to it, the load thus thrown on the clutch 82 will slip it, whereupon the gearing will take up the load as before explained, and the gear 72 will move rearwardly to quickly pull the clutch wide open and prevent plate drag over extended periods such as occurs in a clutch which is controlled by a speed responsive means only when the speed remains for a long period close to the transfer point.

At vehicle speeds less than 27 M. P. H., in direct drive, the clutch 82 is always engaged with a pressure which is only about double that required to maintain the vehicle at the speed at which it is then moving on a substantially level road. It is this fact that permits the operator, by suddenly substantially doubling the torque and applying it more quickly than the vehicle speed can rise in response to it, to slip and pull open the directly driving clutch and reestablish gear drive.

The process which takes place in shifting down from automatic direct drive to automatic gear drive is substantially as follows:

As the resistance being encountered gradually decelerates the vehicle in spite of the applied torque, the axial clutch-engaging force becomes less and less until it reaches a point where the clutch slips. Now, because of the fact that the friction of motion is much less than the friction of rest, it follows that when the clutch 82 slips at all it slips considerably, but such slippage will do no damage, inasmuch as the total pressure at the worst possible condition, that is, slippage of the clutch plates at 27 M. P. H., will occur when there is only a total axial pressure on the clutch plates of about 380 pounds distributed over a total clutch plate area of about 270 square inches. This is less than 1½ pounds pressure per square inch of clutch plate area and is entirely insufficient to press the lubricant from between the rubbing surfaces. When it is considered that some flywheel clutches for automotive purposes employ only about 40 square inches of clutch plate area and press this into contact with a pressure of about 800 pounds, that is, 20 pounds per square inch, it will be seen that there is no danger that the automatic clutch 82 will not live under the service which it must perform.

It should now be recalled that the gear 104 is being driven by the gear 72 and that the gear 104 is being revolved faster than the shaft 31. But when the clutch 82 slips sufficiently to permit the gear 61 to revolve twice as fast as the gear 72, then the shaft 31 tries to revolve the gear 104 through the pads 112, which causes the gear 104 to try to revolve the gear 72, which in turn forces the gear 104 axially forward and meshes the clutch teeth 107 and 108.

As soon as this occurs the rearward thrust of the gear 72, due to its load, draws the weights 101 all the way in, whereupon the clutch 82 is wide open, so that there is no drag between the clutch plates. This shift down will take place as fast as the oil may be forced from the space 209 through the hole 208 into the chamber 207, which is a matter of a few seconds.

From the foreging it will be seen that in driving a vehicle equipped with the transmission mechanism herein shown in automatic gear drive, at speeds under 36 M. P. H., an automatic shift up will occur when the operator either permits the vehicle speed to rise to a point where the torque being applied is not needed to maintain it in gear, or when he momentarily reduces the torque being applied to a point lower than that required to maintain the attained vehicle speed in gear.

It will also be seen that, when driving the vehicle in automatic direct drive at speeds under 27 M. P. H., an automatic shift down will occur when the vehicle resistance decelerates the vehicle speed in spite of the torque being applied, or when the applied torque is momentarily increased considerably faster than the vehicle may be accelerated when in direct drive.

The speed of 36 M. P. H., to which the vehicle must be raised to bring about clutch engagement when full engine torque is being transmitted and 27 M. P. H., to which the vehicle must be decelerated under the same torque condition to bring about clutch disengagement, will become 24 and 18 M. P. H., respectively when the manual sliding gear 126 is shifted rearwardly into mesh with the gear 124.

In either event the clutch engaging point for any given torque transmitted is always greater by about 25% than the disengaging point for the same torque. This prevents "hunting", that is, it prevents the clutch repeatedly engaging and again disengaging, a condition which would be present if the engaging and disengaging speed of the clutch were close together and the torque being transmitted varied from just above to just below the given point. By preventing "hunting" the life of the clutch is greatly prolonged.

Having described an embodiment of my invention in which the objects set forth are attained, I claim, 1. Power transmission mechanism comprising, in combination, a driving member, a driven gear and an intermediate gear having helical teeth in mesh with each other, means for connecting the intermediate gear to the driving member to revolve the driven gear, a second means whereby the driven gear may be revolved otherwise than through the intermediate gear, said intermediate gear being shiftable axially by the thrust of the helical teeth, means operative by said axial shift in one direction to effectuate connection between said intermediate gear and the driving member connecting means when the intermediate gear starts to drive the driven gear, and by said axial shift in the other direction to sever connection with the driving member connecting means when the driven gear is being driven by said second means.

2. Power transmission mechanism comprising, in combination, a driving gear, a driven gear and an intermediate gear having helical teeth in mesh with each other, means for connecting the intermediate gear to the driving member to revolve the driven gear, a second means whereby the driven gear may be revolved otherwise than through the intermediate gear, a friction means rotated by the driving member connecting means for urging rotation of the intermediate gear, said intermediate gear being shifted axially in one direction by the helical teeth when the driving member attempts to drive the driven gear through the intermediate gear by its friction connection therewith, and axially in the other direction by the helical teeth when the driven gear is being driven by said second means, and means operative by said axial shift in the first said direction to effectuate rigid driving connection between the intermediate gear and the driving member and in the second said direction to sever said rigid driving connection.

3. Power transmisison mechanism comprising, in combination, a driving member, a driven gear and an intermediate gear having helical teeth in mesh with each other, means for connecting the driven gear directly to the driving member, gear means for connecting the intermediate gear to the driving member, and means operative by said intermediate gear being shifted axially in one direction by the load on the helical teeth to complete said gear connection to the driving member when said direct connection is not in effect and axially in the other direction by the load on the helical teeth to sever said gear connection when said direct connection is in effect.

4. Power transmission mechanism comprising, in combination, a driving member, a driven gear and an intermediate gear having helical teeth in mesh with each other, means for connecting the driven gear to the driving member to be revolved thereby at the same speed, speed reducing means for connecting the intermediate gear to the driving member, said intermediate gear being moved axially in one direction by the thrust due to the helical teeth when the intermediate gear attempts to drive the driven gear and axially in the other direction by the thrust due to the helical teeth when the driven gear drives the intermediate gear, and positive means for drivably connecting the intermediate gear to the said speed reducing means made operative by said axial movement of said intermediate gear in the first said direction and inoperative by said axial movement of said intermediate gear in the second said direction.

5. Power transmission mechanism comprising, in combination, a driving member, a driven gear and an intermediate gear having helical teeth in mesh with each other, means for connecting the driving member to the intermediate gear to revolve the driven gear, a second means whereby the driven gear may be revolved faster than it may be revolved through the intermediate gear, said connecting means including a yieldable driving connection between the driving member and the intermediate gear whereby rotation of the driving member presses the helical teeth of the intermediate gear against the helical teeth of the driven gear thereby causing axial movement of the intermediate gear, said connecting means including also positive connecting means engageable by said axial movement to effectuate driving connection between said driving member and said intermediate gear, the pressure by the helical teeth of the driven gear against the helical teeth of the intermediate gear when said second means revolves the driven gear faster than it may be driven through the intermediate gear being operative to move said helical gear axially out of engagement with said positive connecting means.

6. Power transmission mechanism comprising, in combination, a driving gear, an axially aligned driven gear, a main clutch for connecting the driving and driven gears to revolve in unison, a first and a second countershaft gear in constant mesh with the driving and driven gears respectively, a countershaft clutch engageable by axial movement of one countershaft gear for connecting the first and second countershaft gears in driving relation, means to engage the main clutch, and helical teeth on said gears angled to cause the axial thrust due to the load carried thereby to move one countershaft gear axially in one direction to engage said countershaft clutch when the driven gear is being driven through said countershaft gears and to move said one countershaft gear axially in the other direction to disengage said countershaft clutch when the driven gear is being driven by the driving gear through the main clutch.

7. Power transmission mechanism comprising, in combination, a driving gear, an axially aligned driven gear, a main clutch for connecting the driving and driven gears to revolve in unison, a first and a second countershaft gear in constant mesh with the driving and driven gears respectively, a countershaft clutch engageable by axial movement of the second countershaft gear toward the first to connect the two countershaft gears in driving relation, and helical teeth on said gears angled to provide an axial thrust due to the load carried thereby to move the second countershaft gear axially in one direction to engage said countershaft clutch when the driven gear is being driven by the driving gear through said countershaft gears, and to move said second countershaft gear axially in the other direction to disengage said countershaft clutch when the said second countershaft gear is being driven by the driving gear through the main clutch and the driven gear.

8. Power transmission mechanism comprising, in combination, a driving gear, an axially aligned driven gear, a main clutch for connecting said gears to revolve in unison, a countershaft, a gear secured to said countershaft in constant mesh with said driving gear, a second gear on said countershaft in constant mesh with said driven gear yieldably secured to said countershaft by frictional means to rotate therewith, a clutch member on the countershaft, a corresponding clutch member on the second countershaft gear, and helical teeth on said gears angled to provide an axial thrust due to the load carried thereby operative to move the second countershaft gear axially in one direction to engage its clutch member with the clutch member on the countershaft, and operative to move said second countershaft gear axially in the other direction to disengage its clutch member from the clutch member on the countershaft whenever the said second countershaft gear is being driven by the driving gear through the main clutch and the driven gear at a rotative speed in excess of that of the countershaft.

9. Power transmission mechanism comprising, in combination, a driving member, a driven member, helical gearing for connecting said members, a friction clutch for connecting the driving to the driven member directly, a jaw clutch for connecting the driving to the driven member through said gearing, and means for engaging said friction clutch, the axial thrust of said helical gearing being made operative by engagement of said friction clutch for withdrawing said jaw clutch out of engagement.

10. Power transmission mechanism comprising, in combination, a driving member, a driven member, helical gearing for connecting said members, a friction clutch for connecting the driving to the driven member directly, a jaw clutch for connecting the driving to the driven member through said gearing, and centrifugal means for engaging said friction clutch, the teeth of said helical gearing being made operative by engagement of said friction clutch for withdrawing said jaw clutch out of engagement and made operative by engagement of said jaw clutch for withdrawing said friction clutch out of engagement.

11. Power transmission mechanism comprising, in combination, a driving gear, a coaxial driven gear, first and second countershaft gears in constant mesh with said driving and driven gears, respectively a main clutch engageable by axial movement of the driven gear for drivably connecting the driving and driven gears together, a countershaft clutch engageable by axial movement of the second countershaft gear for drivably connecting the two countershaft gears together, means for engaging the main clutch, and means comprising helical teeth on said gears made operative by engagement of the main clutch to provide axial movement of the second countershaft gear to completely disengage the countershaft clutch and by engagement of the countershaft clutch to provide axial movement of the driven gear to completely disengage the main clutch.

12. Power transmission mechanism comprising, in combination, a driving gear, a coaxial driven gear, first and second countershaft gears in constant mesh with the driving and driven gears, respectively a main clutch engageable by axial movement of the driven gear for drivably connecting the driving and driven gears together, a countershaft clutch engageable by axial movement of the second countershaft gear for drivably connecting the two countershaft gears together, speed responsive means for engaging the main clutch, and torque responsive means comprising helical teeth on the driven gear and second countershaft gear made operative by engagement of the main clutch to provide axial movement of the second countershaft gear to completely disengage the countershaft clutch and by engagement of the countershaft clutch to provide axial movement of the driven gear to completely disengage the main clutch.

13. Power transmission mechanism comprising, in combination, a driving gear, a coaxial driven gear, two countershaft gears in constant mesh with the driving and driven gears, a main clutch having clutch parts connected to the driving and driven gears movable axially into engagement to drivably connect the driving and driven gears together, a countershaft clutch having clutch parts connected to the countershaft gears movable axially into engagement to drivably connect the two countershaft gears together, speed responsive means for moving the main clutch axially into engagement, and helical teeth on said gears, their axial thrust becoming operative by engagement of the main clutch to move the countershaft clutch parts axially into disengagement and by disengagement of the main clutch to move said countershaft clutch axially into engagement.

14. Power transmission mechanism comprising, in combination, a driving gear, a coaxial driven gear, two countershaft gears in constant mesh with the driving and driven gears, a main clutch movable axially into engagement to drivably connect the driving and driven gears together, a countershaft clutch movable axially into engagement to drivably connect the two countershaft gears together, speed responsive means for moving the main clutch axially into engagement, and helical teeth on said gears angled to cause an axial thrust due to the torque carried thereby, means operative by said thrust to move the countershaft clutch axially into disengagement upon engagement of the main clutch and means operative by said thrust to move said main clutch axially into disengagement upon engagement of said countershaft clutch.

15. Power transmission mechanism comprising, in combination, a driving shaft, a coaxial driven member, an axially parallel countershaft, a driving gear secured in fixed position on the driving shaft, a countershaft gear secured in fixed position on the countershaft and in constant mesh with the drive shaft gear, a driven gear secured to but axially slidable on the driven member, a second countershaft gear rotatable about and axially slidable on the countershaft in constant mesh with the driven gear, a main clutch for directly connecting the driving and driven gears operable into disengagement by axial movement of the driven gear, means to engage said main clutch, a countershaft clutch operable by axial movement of the second countershaft gear to drivably connect said second countershaft gear to the countershaft, and helical teeth on the driven gear and the second countershaft gear angled to cause the axial thrust due to the torque transmitted between said gears to force said driven gear axially to disengage the main clutch and said second countershaft gear axially to engage the countershaft clutch, and to cause said second countershaft gear to move to disengage said countershaft clutch when the main clutch operating means engages the main clutch.

16. Power transmission mechanism comprising, in combination, a driving gear, a coaxial driven gear, two countershaft gears in constant mesh with the driving and driven gears, a friction clutch engageable by axial pressure to drivably connect the driving and driven gears together, a countershaft clutch movable axially into engagement to drivably connect the two countershaft gears together, centrifugal means providing axial pressure to engage the friction clutch, and helical teeth on the gears angled to produce an axial thrust due to the torque transmitted thereby, means operative by said axial thrust to oppose said centrifugal means and disengage said friction clutch when said countershaft clutch becomes engaged and means operative by said thrust to disengage said countershaft clutch when said friction clutch becomes engaged.

17. Power transmission mechanism comprising, in combination, a driving gear, a coaxial driven gear, a first and a second countershaft gear in constant mesh with the driving and driven gears respectively, a friction clutch engageable by axial movement of the driven gear to drivably connect the driving and driven gears together, a jaw clutch on the countershaft engageable by axial movement of a countershaft gear to drivably connect the first and second countershaft gears together, centrifugal weights carried by the driven gear operable to move the driven gear axially to engage the friction clutch, helical teeth on the driven gear angled to provide an axial thrust on the driven gear, due to load received thereby, to move said driven gear axially opposite to its clutch engaging movement, and helical teeth on the second countershaft gear angled to provide axial thrust in one direction to engage the jaw clutch when the friction clutch is disengaged and in the other direction to disengage the jaw clutch when the friction clutch is engaged.

18. In combination, a driving shaft, a driving gear and a friction clutch member both secured to said shaft, a driven member rotatable about said shaft, a driven gear secured to said driven member but axially movable thereon, a second friction clutch member on the driven gear movable axially into engagement with the first by said axial movement, centrifugal weights on said driven gear operable to cause said axial movement thereby to engage said friction clutch, a countershaft, a gear rigidly secured to said countershaft in mesh with said driving gear, a second gear freely rotatable on said countershaft in constant mesh with the driven gear, a jaw clutch for connecting the second countershaft gear to the countershaft engageable by axial movement of said second countershaft gear, helical teeth on the driven gear angled to provide an axial thrust due to load received by said gear to urge it axially opposite to the direction in which it is being urged by said weights, and helical teeth on the second countershaft gear angled to provide an axial thrust in a direction to engage the jaw clutch when said second countershaft gear is driving the driven gear and in a direction to disengage the jaw clutch when the driven gear is driving the second countershaft gear.

19. In combination, a driving member, a driven member, a clutch for connecting said members to revolve in unison, gears for connecting said members to revolve at different speeds, one of said gears carrying means movable axially to complete said gear connection and another of said gears carrying means movable axially to disengage said clutch, speed responsive means to engage said clutch, and torque responsive means comprising helical teeth on the two axially movable gears angled to create an axial thrust to move the one said gear to disengage said clutch and the other said gear to complete said gear connection.

20. The combination of a driving member, a driven member, a main clutch for directly connecting said members, a gear train for gear connecting said members, an axially operable jaw clutch connecting two members of said gear train, means for connecting said main clutch, and torque responsive means comprising helical teeth on said gearing made operative by connection of said main clutch to move one said gear axially and thereby disengage said jaw clutch.

FREDERICK W. COTTERMAN.